US010614028B2

(12) United States Patent
Mundkur et al.

(10) Patent No.: US 10,614,028 B2
(45) Date of Patent: Apr. 7, 2020

(54) NETWORK TRAFFIC ROUTING IN DISTRIBUTED COMPUTING SYSTEMS

(71) Applicant: Microsoft Technology Licensing, LLC, Redmond, WA (US)

(72) Inventors: Sambhrama Mundkur, Sammamish, WA (US); Fengfen Liu, Sammamish, WA (US); Norman Lam, Sammamish, WA (US); Andrew Putnam, Seattle, WA (US); Somesh Chaturmohta, Redmond, WA (US); Daniel Firestone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 15/824,914

(22) Filed: Nov. 28, 2017

(65) Prior Publication Data

US 2019/0081891 A1 Mar. 14, 2019

Related U.S. Application Data

(60) Provisional application No. 62/558,827, filed on Sep. 14, 2017.

(51) Int. Cl.
*G06F 15/173* (2006.01)
*H04L 29/06* (2006.01)
(Continued)

(52) U.S. Cl.
CPC .... *G06F 15/17331* (2013.01); *G06F 9/45533* (2013.01); *G06F 9/45558* (2013.01);
(Continued)

(58) Field of Classification Search
CPC ........... G06F 15/17331; G06F 9/45558; G06F 15/76; G06F 9/45533; G06F 2009/45583;
(Continued)

(56) References Cited

U.S. PATENT DOCUMENTS 9,729,442 B1* 8/2017 Stark .................... H04L 45/745
2007/0189186 A1 8/2007 Freeburg
(Continued)

OTHER PUBLICATIONS

Tonsing, Johann, "OVS Acceleration Using Network Flow Processors", Retrieved From: http://www.openvswitch.org/support/ovscon2014/18/1300-ovs-accel-nfp-2014-11-18.pdf, Nov. 18, 2014, 23 Pages.
(Continued)

*Primary Examiner* — Ajay Cattungal
(74) *Attorney, Agent, or Firm* — Liang IP, PLLC

(57) ABSTRACT

Distributed computing systems, devices, and associated methods of packet routing are disclosed herein. In one embodiment, a method includes receiving, from a computing network, a packet at a packet processor of a server. The method also includes matching the received packet with a flow in a flow table contained in the packet processor and determining whether the action indicates that the received packet is to be forwarded to a NIC buffer in the outbound processing path of the packet processor instead of the NIC. The method further includes in response to determining that the action indicates that the received packet is to be forwarded to the NIC buffer, forwarding the received packet to the NIC buffer and processing the packet in the NIC buffer to forward the packet to the computer network without exposing the packet to the main processor.

20 Claims, 11 Drawing Sheets

(51) Int. Cl.

| | |
|---|---|
| *G06F 9/455* | (2018.01) |
| *G06F 15/76* | (2006.01) |
| *H04L 12/813* | (2013.01) |
| *H04L 12/801* | (2013.01) |
| *H04L 12/935* | (2013.01) |
| *H04L 12/931* | (2013.01) |
| *H04L 12/46* | (2006.01) |
| *H04L 12/911* | (2013.01) |
| *H04L 12/861* | (2013.01) |
| *H04L 12/707* | (2013.01) |
| *H04L 12/721* | (2013.01) |
| *H04L 12/717* | (2013.01) |
| *H04L 12/741* | (2013.01) |
| *H04L 29/08* | (2006.01) |

(52) U.S. Cl.
CPC .......... *G06F 15/76* (2013.01); *H04L 12/4641* (2013.01); *H04L 45/24* (2013.01); *H04L 45/38* (2013.01); *H04L 45/42* (2013.01); *H04L 45/54* (2013.01); *H04L 47/193* (2013.01); *H04L 47/20* (2013.01); *H04L 47/34* (2013.01); *H04L 47/39* (2013.01); *H04L 47/741* (2013.01); *H04L 47/822* (2013.01); *H04L 49/3027* (2013.01); *H04L 49/3045* (2013.01); *H04L 49/354* (2013.01); *H04L 49/9068* (2013.01); *H04L 69/12* (2013.01); *H04L 69/22* (2013.01); *G06F 2009/45583* (2013.01); *G06F 2009/45595* (2013.01); *H04L 49/70* (2013.01); *H04L 67/10* (2013.01); *H04L 67/1097* (2013.01); *H04L 69/161* (2013.01)

(58) Field of Classification Search
CPC ........... G06F 2009/45595; H04L 69/12; H04L 47/20; H04L 47/39; H04L 49/3027; H04L 49/354; H04L 12/4641; H04L 69/22; H04L 47/193; H04L 47/741; H04L 47/822; H04L 49/3045; H04L 49/9068; H04L 45/24; H04L 45/38; H04L 45/42; H04L 45/54; H04L 47/34; H04L 69/161; H04L 67/1097; H04L 49/70; H04L 67/10
See application file for complete search history.

(56) References Cited

U.S. PATENT DOCUMENTS

| | | | |
|---|---|---|---|
| 2009/0221292 A1* | 9/2009 | Lundh | H04L 47/10 455/445 |
| 2009/0271412 A1 | 10/2009 | Lacapra et al. | |
| 2009/0318088 A1* | 12/2009 | Wu | H04B 7/0697 455/63.4 |
| 2012/0151473 A1 | 6/2012 | Koch et al. | |
| 2012/0260296 A1* | 10/2012 | Mallet | H04W 76/15 725/62 |
| 2013/0058357 A1* | 3/2013 | Koponen | H04L 12/4633 370/412 |
| 2013/0148668 A1 | 6/2013 | Kean et al. | |
| 2014/0269724 A1* | 9/2014 | Mehler | H04L 45/30 370/392 |
| 2014/0297775 A1 | 10/2014 | Davda et al. | |
| 2016/0188527 A1 | 6/2016 | Cherian et al. | |
| 2016/0285744 A1* | 9/2016 | Panchagnula | H04L 45/24 |
| 2017/0034268 A1 | 2/2017 | Govind | |
| 2017/0041209 A1* | 2/2017 | Joshi | H04L 45/64 |
| 2017/0093732 A1* | 3/2017 | Akhavain Mohammadi | H04L 45/74 |
| 2017/0230284 A1* | 8/2017 | Yamashita | H04L 45/74 |
| 2017/0371835 A1 | 12/2017 | Ranadive et al. | |
| 2018/0246756 A1 | 8/2018 | Abali et al. | |
| 2019/0079897 A1 | 3/2019 | Kochevar-Cureton et al. | |
| 2019/0081899 A1 | 3/2019 | Mundkur et al. | |

OTHER PUBLICATIONS

Firestone, Daniel, "VFP: A Virtual Switch Platform for Host SDN in the Public Cloud", In Proceedings of 14th USENIX Symposium on Networked Systems Design and Implementation, Mar. 27, 2017, pp. 315-328.

"International Search Report & Written Opinion Issued in PCT Application No. PCT/US2018/039637", dated Sep. 10, 2018, 13 Pages.

"International Search Report & Written Opinion Issued in PCT Application No. PCT/US2018/039638", dated Sep. 10, 2018, 13 Pages.

"International Search Report & Written Opinion Issued in PCT Application No. PCT/US2018/039640", dated Sep. 10, 2018, 12 Pages.

"Non-Final Office Action Issued in U.S. Appl. No. 15/907,546", dated Oct. 3, 2019, 14 Pages.

"Notice of Allowance Issued in U.S. Appl. No. 15/824,925", dated Aug. 5, 2019, 9 Pages.

* cited by examiner

NETWORK TRAFFIC ROUTING IN DISTRIBUTED COMPUTING SYSTEMS

CROSS-REFERENCE TO RELATED APPLICATION(S)

This application is a Non-provisional application of and claims priority to U.S. Provisional Application No. 62/558,827, filed on Sep. 14, 2017.

BACKGROUND

Distributed computing systems typically include routers, switches, bridges, and other physical network devices that interconnect large numbers of servers, network storage devices, or other types of computing devices. The individual servers can host one or more virtual machines ("VMs"), virtual switches, or other types of virtualized functions. The virtual machines can facilitate execution of suitable applications for individual users to provide desired cloud services or other suitable types of computing services to the users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In cloud-based datacenters or other large scale distributed computing systems, overlay protocols such as Virtual Extensible Local Area Network ("VELAN") and virtual switching, can involve complex packet manipulation actions. As such, processing complexity related to server-based networking data plane has increased dramatically to support such overlay protocols. With ever increasing network interface bandwidths, performing these complex packet manipulation actions in software imposes a heavy burden on processing resources at the servers to leave little or no processing resources to run user applications.

To address such challenges, certain hardware circuitry has been developed for offloading at least a portion of the data plane processing from server processors. For example, servers can incorporate a Field Programmable Gate Array ("FPGA") by coupling the FPGA to a Network Interface Card ("NIC") and a Central Processing Unit ("CPU"). During runtime, a software controller at the CPU an program the FPGA to perform flow action matching or other suitable data plane actions. For instance, the FPGA can be configured to implement an inbound processing path that includes an inbound packet buffer for holding received inbound packets, a parser configured to parse headers of the inbound packets, a lookup circuit configured to locate one or more matching actions in a flow match table based on at least a portion of the parsed headers, and an action circuit configured to performed the one or more matching actions on the inbound packets. The FPGA can also include an outbound processing path that includes similar components coupled to one another in a reverse direction of the inbound processing path.

In operation, the inbound processing path can receive an inbound packet from a computer network via, for example, a top-of-rack switch ("TOR"), store the received inbound packet in the inbound packet buffer, parse headers of the received inbound packet, locate one or more matching actions for the packet based on at least a portion of the headers, and perform the one or more matching actions on the inbound packet before forwarding the processed inbound packet to the NIC. The outbound processing path can receive an outbound packet from, for example, the NIC or the CPU, store the outbound packet in an outbound packet buffer, parse the received outbound packet, locate one or more matching actions for the outbound packet, and perform the one or more matching actions on the outbound packet before forwarding the processed outbound packet to the computer network, for example, via the same TOR.

The foregoing FPGA implementation, however, have several drawbacks. For example, the FPGA implementation directly forwards inbound/outbound packets to either the NIC or the TOR. Such direct forwarding can limit a number of NICs that a single FPGA can support because the FPGA only supports one inbound and one outbound processing path. Also, in certain datacenters, an Express Route ("ER") gateway can serve as a next hop for secured network traffic coming from an on-premise network (e.g., a private network of an organization) to a virtual network in a datacenter. In operation, the FPGA at the ER gateway can receive and subsequently forward packets from the on-premise network to a CPU of the ER gateway for further processing. However, the CPU of the ER gateway does not apply any significant processing to the packets because the network traffic is received via a secured connection. Instead, the CPU executes certain instructions to provide a virtual machine ("VM") that simply routes the received packets back to the NIC. The NIC, in turn, transmits the packets to a destination VM hosted on, for instance, another server, using IP forwarding or other suitable routing protocols. Thus, sending traffic via the VM at the ER gateway can add to network latency related to processing the packets from the on-premise network.

In another example, the direct forwarding implementation of the FPGA can also prevent communications between two network enabled VMs on the same server in a datacenter. When one VM transmits a packet to the other VM via a virtual network, the source address/port and the destination address/port contained in a header of the packet transmitted to the TOR are the same because the same server hosts both VMs. In the foregoing implementation of the FPGA, the FPGA forwards all the outbound traffic to the TOR and all inbound traffic to the NIC. As such, the packet from one VM to another would appear to the TOR as one that originates from and destined to the same network location, i.e., the server hosting both VMs. The TOR would then deem the packet as being invalid and drop the packet. As such, communications between the two VMs on the same server would be inoperable.

Several embodiments of the disclosed technology can address at least some of the foregoing limitations of direct forwarding in the FPGA by enabling packet routing inside the FPGA. In certain embodiments, in addition to the components of the FPGA described above, the FPGA can also include (i) a TOR buffer and an inbound multiplexer in the inbound processing path; and (ii) a NIC buffer and an outbound multiplexer in the outbound processing path. The inbound multiplexer can be configured to receive input from the inbound packet buffer or the TOR buffer, and provide an output to the parser in the inbound processing path. The outbound multiplexer can be configured to receive input from the outbound packet buffer and the NIC buffer, and provide an output to the parser in the outbound processing path. The inbound multiplexer can be configured to process packets from the TOR buffer or the inbound packet buffer and the outbound multiplexer can be configured to process packets from the NIC buffer or the outbound packet buffer alternately, in a round-the-robin fashion, or in other suitable manners.

In accordance with embodiments of the disclosed technology, the action circuit of the inbound processing path can be configured to copy or forward inbound packets to the NIC buffer or alternatively to the NIC. Similarly, the action circuit of the outbound processing path can be configured to forward outbound packets to the TOR buffer or alternatively to the TOR according to certain policies or rules contained in a Match Action Table ("MAT") in the FPGA. For example, upon receiving an inbound packet from the TOR, the inbound parser can parse at least a portion of the header of the inbound packet and forward the parsed header to the lookup circuit in the inbound processing path. The lookup circuit can then match the packet to a flow based on at least a portion of the parsed header and identify an action for the inbound packet contained in the MAT. The action circuit can then perform the identified action by, for example, transposing or otherwise modifying the header of the inbound packet and forwarding the inbound packet with the modified header to the NIC buffer directly instead of to the NIC. The outbound multiplexer can then process the inbound packet in the NIC buffer by forwarding the inbound packet to the outbound parser. The inbound packet with the modified header can then be processed according at least partially to parsed header of the inbound packet and forwarded to the TOR according to another policy or rule included in the MAT. As such, the inbound packet can be returned to the computer network via the TOR without being transmitted to the CPU to be processed in software. As a result, an ER gateway having the foregoing implementation of FPGA can avoid using VMs for routing packets received from an on-premise network, and thus significantly reducing network latency for processing the received packets in the datacenter.

Certain embodiments of the foregoing implementation of FPGA can also enable communications between two networking enabled VMs on a single server in the datacenter. For example, upon receiving an outbound packet from the NIC or the CPU, the lookup circuit in the outbound processing path can be configured to determine that the outbound packet belongs to a flow from a first VM to a second VM on the same server. The lookup circuit can then identify an action involving one or more header modifications such as virtual network addresses, virtual port numbers, etc. for the outbound packet. The action circuit in the outbound processing path can then modify the header of the outbound packet before forwarding the outbound packet to the TOR buffer instead of the TOR. The outbound packet with the modified header can then be processed by the inbound processing path as described above to be forwarded to the second VM on the same server. As such, the TOR never receives the outbound packet from the first VM to the second VM on the same server, and thus cannot drop the outbound packet.

Several implementations of the FPGA can also allow the FPGA to support multiple NICs on a single server. In certain embodiments, the FPGA can assign a unique identifier (e.g., a numerical value) for each network interface. For instance, network interfaces to/from a first NIC and a second NIC can be assigned values such as 1, 2, 3, 4, or other suitable identifiers. Thus, during operation, the FPGA can identify inbound/outbound packets belonging to different network interfaces and forward the inbound/outbound packets accordingly via corresponding packet buffers.

DETAILED DESCRIPTION

Certain embodiments of systems, devices, components, modules, routines, data structures, and processes for routing network traffic in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Figure 5:
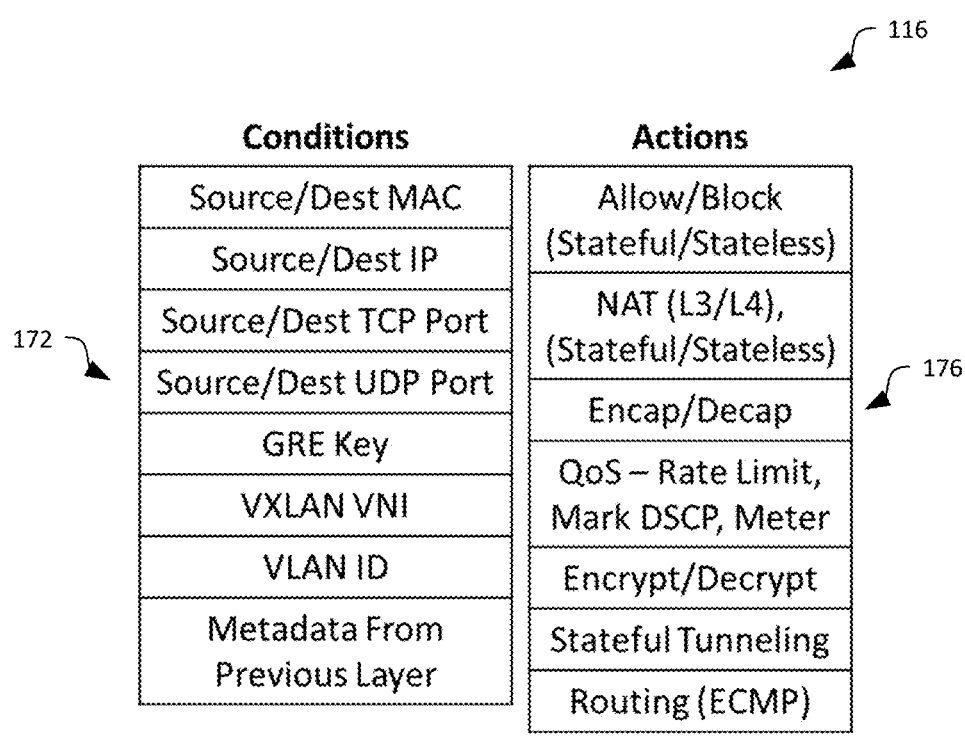
FIG. 5 is a schematic diagram illustrating example conditions and corresponding actions for a rule object suitable for a hardware packet processor in accordance with embodiments of the disclosed technology.

Further used herein, a Match Action Table ("MAT") generally refers to a data structure having multiple entries in a table format. Each of the entries can include one or more conditions and one or more corresponding actions. The one or more conditions can be configured by a network controller (e.g., an Software Defined Network or "SDN" controller) for matching a set of header fields of a packet. The action can also be programmed by the network controller to apply an operation to the packet when the conditions match the set of header fields of the packet. The applied operation can modify at least a portion of the packet in order to forward the packet to an intended destination. Further used herein, a "flow" generally refers to a stream of packets received/transmitted via a single network connection between two end points (e.g., servers, virtual machines, or applications executed in the virtual machines). A flow can be identified by, for example, an IP address and a TCP port number. A flow can have one or more corresponding entries in the MAT having one or more conditions and actions. Example conditions and actions are shown in FIG. 5.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information. An example data schema for control data is described in more detail below with reference to FIGS. 6A-6B.

Figure 1:
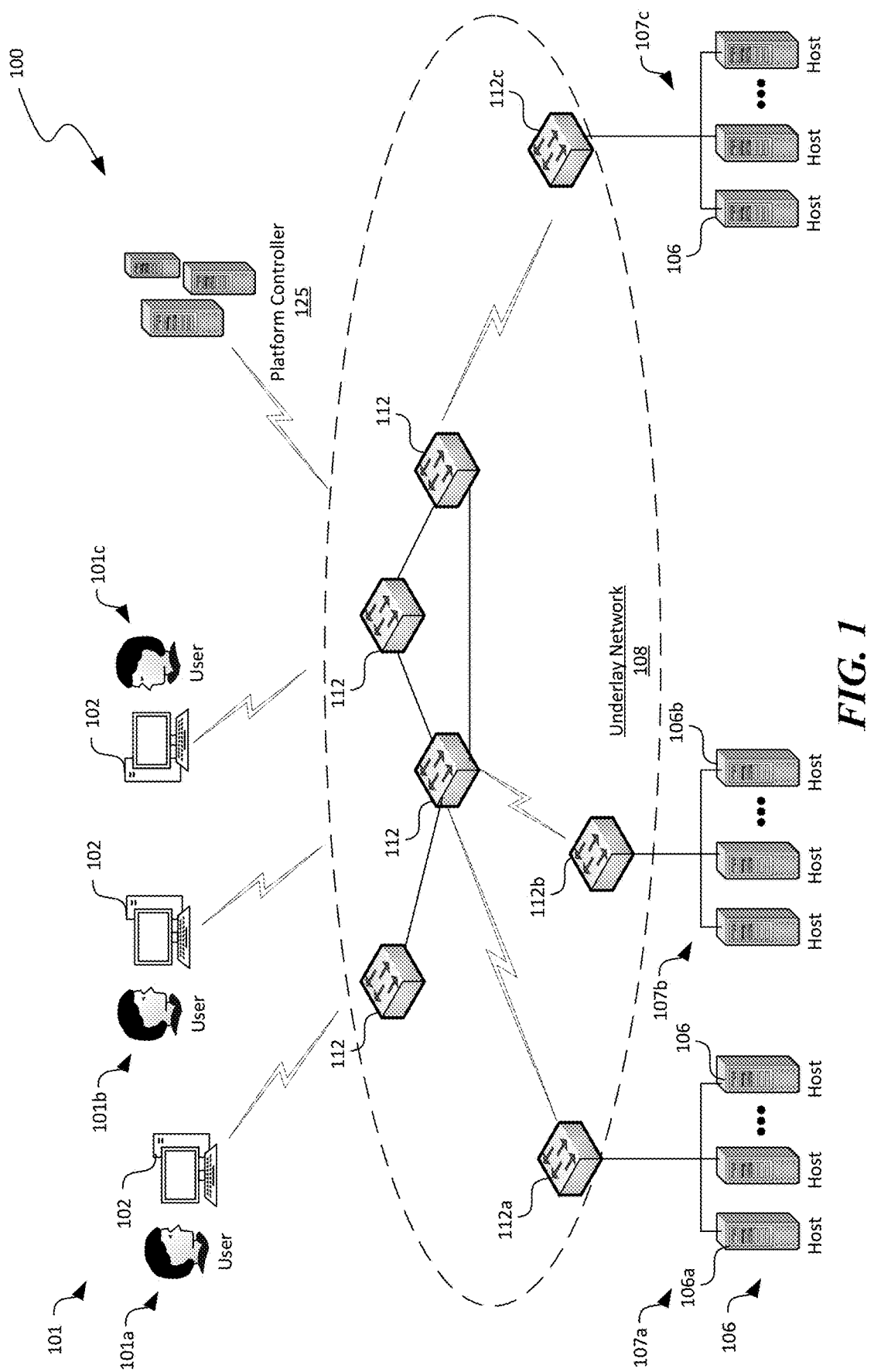
FIG. 1 is a schematic diagram illustrating a distributed computing system implementing network traffic routing in accordance with embodiments of the disclosed technology.

FIG. 1 is a schematic diagram illustrating a distributed computing system 100 implementing network traffic routing in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topology. The underlay network can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the provided virtual machines 144 to perform computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access cloud services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

The platform controller 125 can be configured to manage operations of various components of the distributed computing system 100. For example, the platform controller 125 can be configured to allocate virtual machines 144 (or other suitable resources) in the distributed computing system 100, monitor operations of the allocated virtual machines 144, or terminate any allocated virtual machines 144 once operations are complete. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

Figure 2:
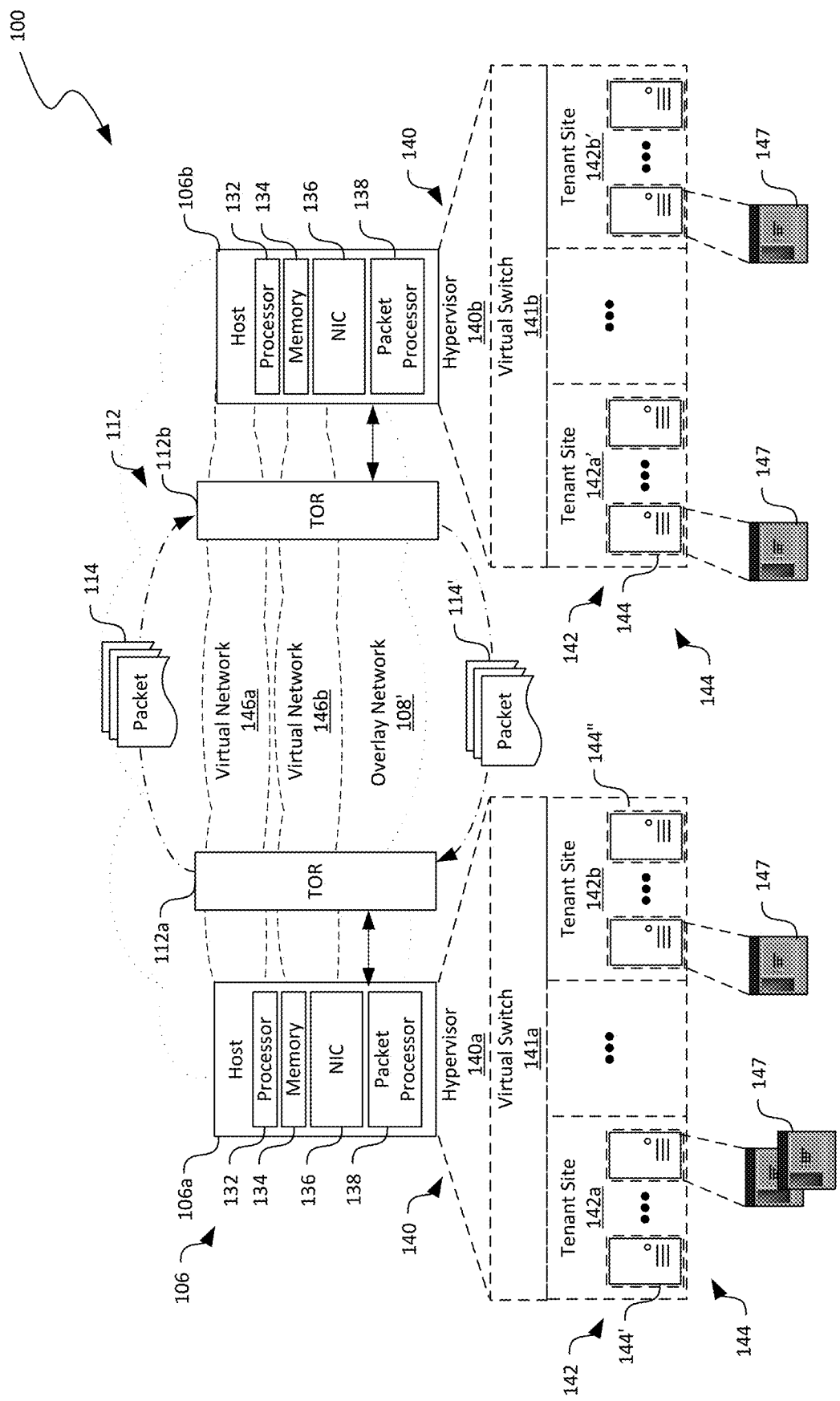
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and network interface card 136, and a packet processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7A and 7B). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses. To facilitate communications among the virtual machines 144, the virtual switches 141 can be configured to switch or filter packets (not shown) directed to different virtual machines 144 via the network interface card 136 and facilitated by the packet processor 138.

As shown in FIG. 2, to facilitate communications with one another or with external devices, the individual hosts 106 can also include a network interface controller ("NIC")

136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a packet processor 138 can be interconnected and/or integrated with the NIC 136 in order to facilitate network processing operations for enforcing communications security, performing network virtualization, translating network addresses, maintaining a communication flow state, or performing other suitable functions. In certain implementations, the packet processor 138 can include a Field-Programmable Gate Array ("FPGA") integrated with the NIC 136. An FPGA can include an array of logic circuits and a hierarchy of reconfigurable interconnects that allow the logic circuits to be "wired together" like logic gates by a user after manufacturing. As such, a user can configure logic blocks in FPGAs to perform complex combinational functions, or merely simple logic operations to synthetize equivalent functionality executable in hardware at much faster speeds than in software. In the illustrated embodiment, the packet processor 138 has one interface communicatively coupled to the NIC 136 and another coupled to a network switch (e.g., a Top-of-Rack or "TOR" switch) at the other. In other embodiments, the packet processor 138 can also include an Application Specific Integrated Circuit ("ASIC"), a microprocessor, or other suitable hardware circuitry. In any of the foregoing embodiments, the packet processor 138 can be programmed by the processor 132 (or suitable software components associated therewith) to route packets inside the packet processor 138 in order to enable routing network traffic between two virtual machines 144 on a single host 106 and/or other purposes, as described in more detail below with reference to FIGS. 3A-4.

In operation, the processor 132 and/or a user 101 (FIG. 1) can configure logic circuits in the packet processor 138 to perform complex combinational functions or simple logic operations to synthetize equivalent functionality executable in hardware at much faster speeds than in software. For example, the packet processor 138 can be configured to process inbound/outbound packets for individual flows according to configured policies or rules contained in a flow table such as a MAT. The flow table can contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the packet processor 138 identifies an inbound/outbound packet as belonging to a particular flow, the packet processor 138 can apply one or more corresponding policies in the flow table before forwarding the processed packet to the NIC 136 or TOR 112. For example, as shown in FIG. 2, the application 147, the virtual machine 144, and/or other suitable software components on the first host 106a can generate an outbound packet 114 destined to, for instance, another application 147 at the second host 106b. The NIC 136 at the first host 106a can forward the generated packet 114 to the packet processor for processing according to certain policies in a flow table. Once processed, the packet processor 138 can forward the outbound packet 114 to the first TOR 112a, which in turn forwards the packet to the second TOR 112b via the overlay/underlay network 108 and 108'.

The second TOR 112b can then forward the packet 114 to the packet processor 138 at the second host 106b to be processed according to other policies in another flow table at the second hosts 106b. If the packet processor 138 cannot identify a packet as belonging to any flow, the packet processor 138 can forward the packet to the processor 132 via the NIC 136 for exception processing. In another example, when the first TOR 112a receives an inbound packet 114', for instance, from the second host 106b via the second TOR 112b, the first TOR 112a can forward the packet 114' to the packet processor 138 to be processed according to a policy associated with a flow of the packet 114'. The packet processor 138 can then forward the processed packet 114' to the NIC 136 to be forwarded to, for instance, the application 147 or the virtual machine 144.

In certain implementations, the packet processor 138 is configured to always forward processed packets 114/114' to either the NIC 136 or the TOR 112 following a direct forwarding scheme. Such a direct forwarding scheme, however, can have certain limitations. For example, the direct forwarding scheme can limit a number of NICs 136 that a single packet processor 138 can support because the packet processor 138 only supports one inbound/outbound network interface at one connection end.

In another example, the NIC/packet processor 136/138 can forward packets to the processor 132 for software processing even though the processor 132 has no need to or otherwise does not apply any modifications to the packets. Instead, the processor 132 simply routes the packets back to the NIC/packet processor 136/138, which in turn transmit the packets to the underlay network 108. For instance, an Express Route ("ER") gateway can serve as a next hop for network traffic coming from an on-premise network to a virtual network in the distributed computing system 100. In operation, the NIC/packet processor 136/138 would forward the packets 114 to the processor 132 of an ER gateway server (e.g., the first host 106a). However, the processor 132 of the first host 106a does not apply any processing to the network traffic because the network traffic is received via a secured connection and thus considered secure. Instead, the processor 132 at the first host 106a would instantiate a virtual machine 144 to simply route the network traffic back to the NIC/packet processor 136/138 to be transmitted to a destination virtual machine 144 on, for instance, the second host 106b, using IP forwarding or other suitable protocols. Thus, routing network traffic via the virtual machine 144 at the ER gateway server can add significant extra network latency for the network traffic coming from an on-premise network.

In another situation, the direct forwarding scheme of the packet processor 138 can prevent network communications between two networking enabled virtual machines 144 on the same host 106. For example, a first virtual machine 144' on the first host 106a can attempt to transmit a packet to a second virtual machine 144" on the same first host 106a. The packet would have different source/destination addresses only for virtual network addresses. However, the source address/port and the destination address/port contained in a header of the packet would be the same when the packet is forwarded to the first TOR 112a because both the first and second virtual machines 144' and 144" are hosted on the first host 106a. As such, both the source and destination addresses of the packet would be a physical network address of the first host 106a. Thus, when the packet processor 138 forwards the packet to the first TOR 112a, and the first TOR 112a would deem the packet as invalid because the packet appears to be coming from and going to the same network address/port. As such, the first TOR 112a would drop the packet as undeliverable.

Several embodiments of the disclosed technology can address at least some aspects of the foregoing limitations by implementing network traffic routing inside the packet processor 138. As such, the packet processor 138 can route received network traffic back to the overlay/underlay network 108'/108 without being directly forwarded to the NIC 136. The packet processor 138 can also route network traffic received from the NIC 136 back to the NIC 136 without sending the network traffic to the TOR 112. In another implementation, the packet processor 138 can also support multiple NICs 136 at the same host 106, as described in more detail below with reference to FIGS. 3A-4.

Figure 3A:
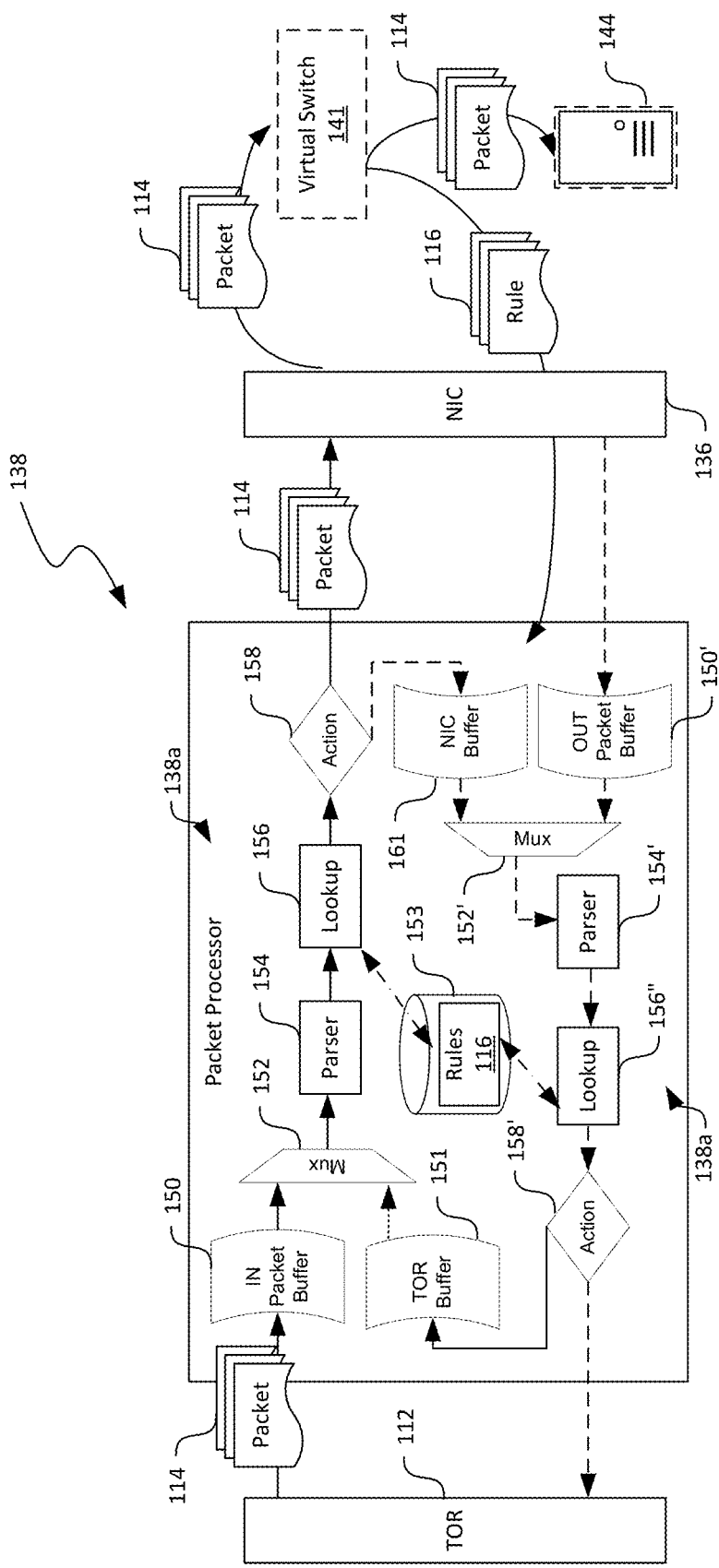
FIGS. 3A-3C are schematic diagrams illustrating a hardware packet processor implemented at a host in a distributed computing system during certain operations in accordance with embodiments of the disclosed technology.
Figure 3B:
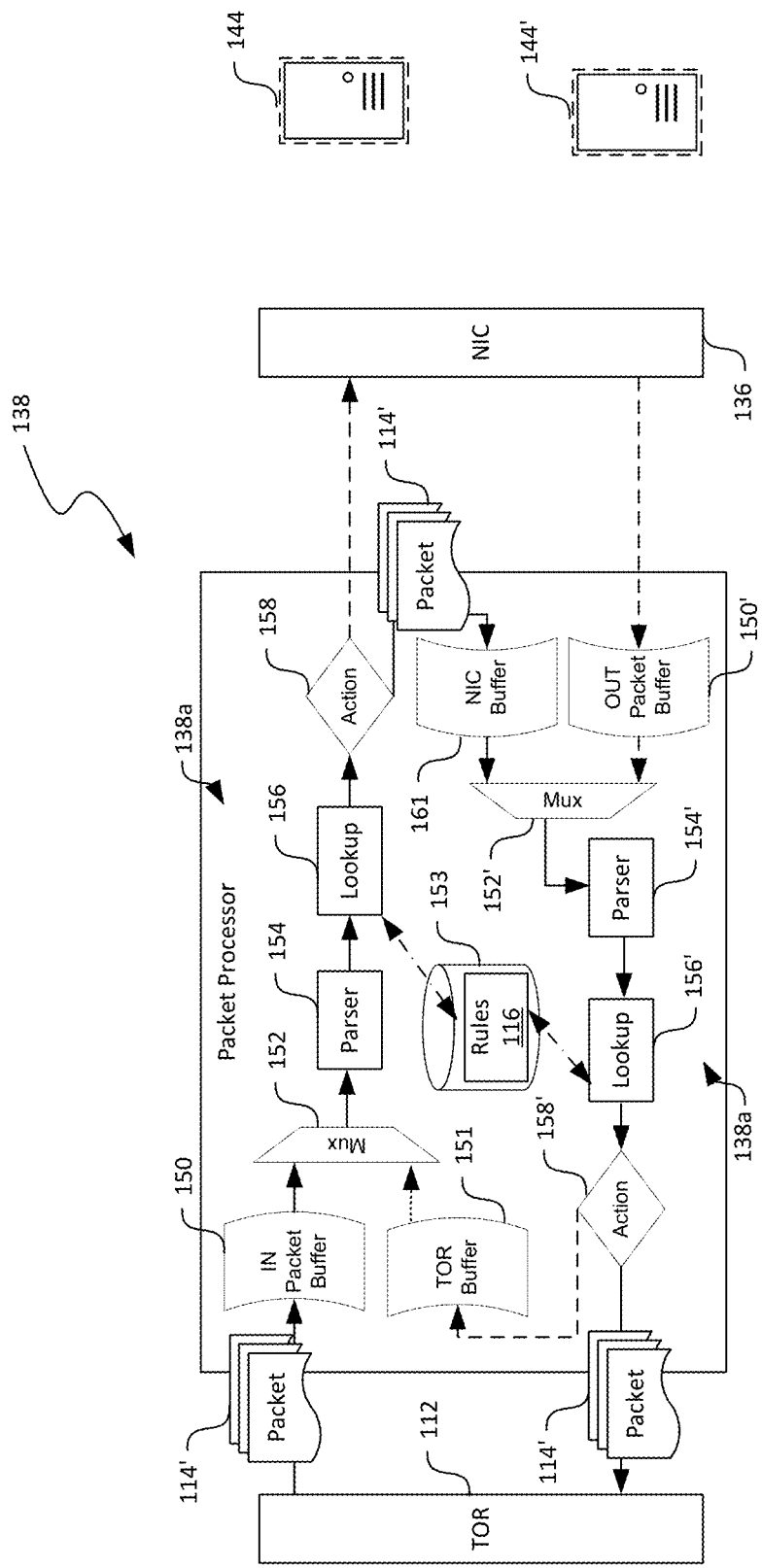
Figure 3C:
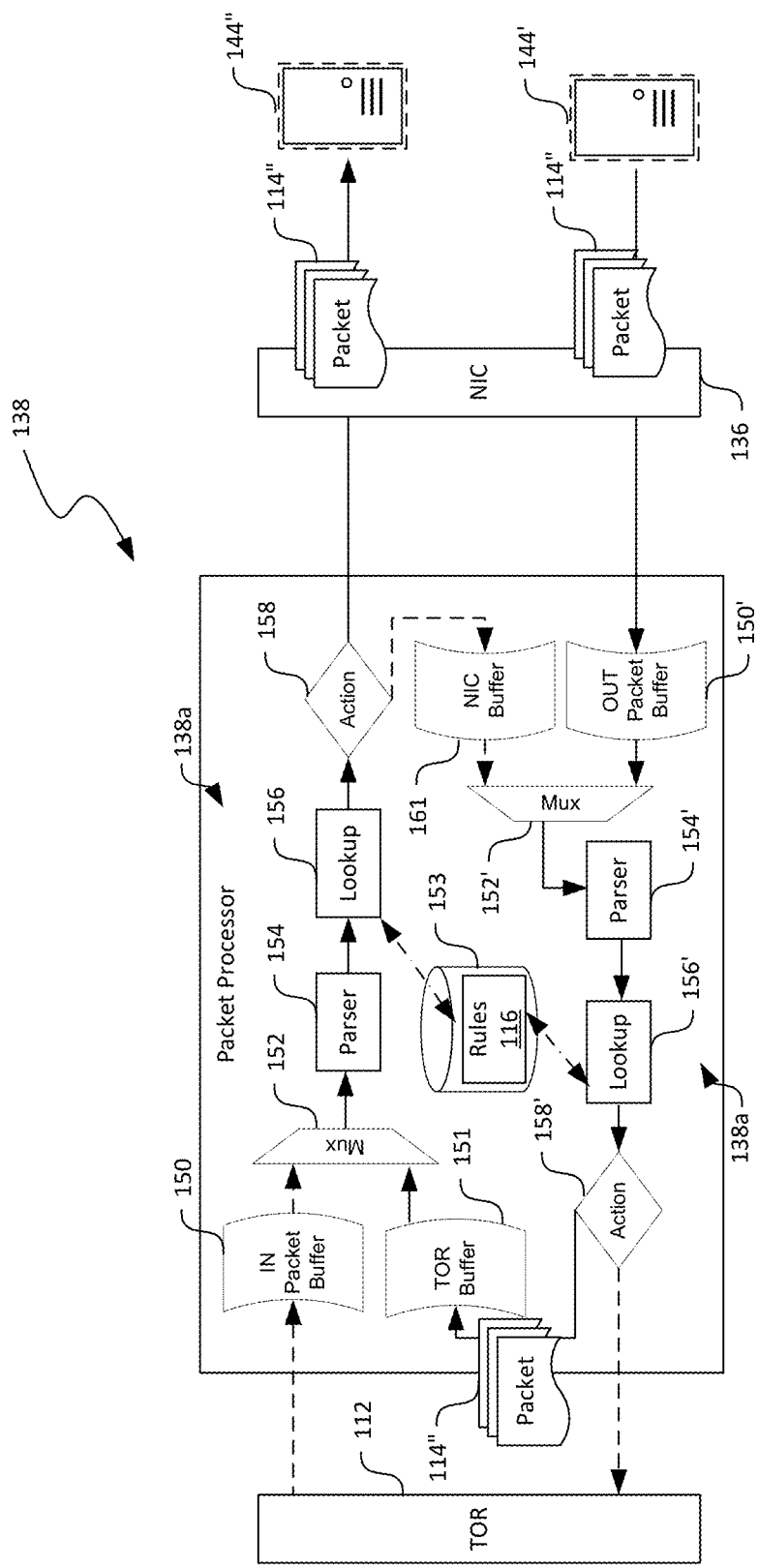

FIG. 3A-3C are schematic diagrams illustrating a hardware packet processor 138 implemented at a host 106 in a distributed computing system 100 during certain operations in accordance with embodiments of the disclosed technology. As shown in FIG. 3A, in certain implementations, the packet processor 138 can include an inbound processing path 138a and an outbound processing path 138b in opposite processing directions. As shown in FIG. 3A, the inbound processing path 138a can include a set of processing circuits having an inbound packet buffer 150 (shown as "IN Packet Buffer" in FIG. 3A), a parser 152, a lookup circuit 156, and an action circuit 158 interconnected with one another in sequence. The outbound processing path 138b can include another set of processing circuits having an outbound packet buffer 150' (shown as "OUT Packet Buffer" in FIG. 3A), a parser 152', a lookup circuit 156', and an action circuit 158' interconnected with one another in sequence and in the opposite processing direction.

In accordance with embodiments of the disclosed technology, the packet processor 138 can also include a TOR buffer 151 and an inbound multiplexer 152 in the inbound processing path 138a and a NIC buffer 161 and an outbound multiplexer 152' in the outbound processing path 138b. As shown in FIG. 3A, the TOR buffer 151 and the inbound packet buffer 150 are arranged to provide an output to the inbound multiplexer 152. The NIC buffer 161 and the outbound packet buffer 150' are arranged to provide an output to the outbound multiplexer 152'. In turn, the inbound multiplexer 152 can be configured to receive input from each of the inbound packet buffer 150 and the TOR buffer 151 and provide an output to the parser 154 in the inbound processing path 138a. The outbound multiplexer 152' can be configured to receive input from the outbound packet buffer 150' and the NIC buffer 161 and provide an output to the parser 154' in the outbound processing path 138b. The inbound multiplexer 152 can be configured to process packets from the TOR buffer 151 or the inbound packet buffer 150 alternately, in a round-the-robin fashion, or in other suitable manners. The outbound multiplexer 152' can be configured to process packets from the NIC buffer 161 or the outbound packet buffer 150' alternately, in a round-the-robin fashion, or in other suitable manners.

As shown in FIG. 3A, the packet processor 138 can also include a memory 153 containing a flow table having one or more policies or rules 116. The rules 116 can be configured by, for example, the virtual switch 141 or other suitable software components provided by the processor 132 (FIG. 2) to provide certain actions when corresponding conditions are met. Example conditions and actions are described in more detail below with reference to FIG. 5. Even though the flow table is shown being contained in the memory 153 in the packet processor 138, in other embodiments, the flow table may be contained in a memory (not shown) outside of the packet processor 138, in the memory 134 (FIG. 2), or in other suitable storage locations.

FIG. 3A shows an operation of the packet processor 138 when receiving an inbound packet 114 that is not identifiable by the packet processor 138 as being belonging to a flow and thus does not have a corresponding rule 116. As shown in FIG. 3A, the TOR 112 can forward the packet 114 to the packet processor 138 to be stored in the inbound packet buffer 150. The inbound multiplexer 152 can then forward the packet 114 from the inbound packet buffer 150 to the inbound parser 154. The inbound parser 154 can parse at least a portion of the header of the packet 114 and forward the parsed header to the lookup circuit 156 in the inbound processing path 138a. The lookup circuit 156 can then attempt to match the packet 114 to a flow based on the parsed header and identify an action for the packet 114 as contained in the flow table.

However, when lookup circuitry 156 cannot match the packet 114 to any existing flow in the flow table, the action circuit 158 can forward the received packet 114 to a software component (e.g., the virtual switch 141) provided by the processor 132 for further processing. As shown in FIG. 3A, the virtual switch 141 (or other suitable software components) can then generates data representing a flow to which the packet 114 belongs and one or more rules 116 for the flow. The virtual switch 141 can then transmit the created rules 116 to the packet processor 138 to be stored in the memory 153. In the illustrated embodiment, the virtual switch 141 also forwards the received packet 114 to a virtual machine 144. In other embodiments, the virtual switch 141 can forward the packet 114 back to the packet processor 138 to be processed by the created new rules 116, or perform other suitable operations on the packet 114.

In accordance with embodiments of the disclosed technology, the action circuit 158 of the inbound processing path 138a can be configured to forward inbound packets 114 to the NIC buffer 161 as shown in FIG. 3B, and the action circuit 158' of the outbound processing path 138b can be configured to forward outbound packets 114" to the TOR buffer 151, as shown in FIG. 3C, according to certain policies or rules 116 contained in the flow table. In FIGS. 3B and 3C, solid lines represent used network traffic paths while dashed lines represent unused network traffic paths.

As shown in FIG. 3B, upon receiving an inbound packet 114' from the TOR 112, the inbound parser 154 can parse at least a portion of the header of the packet 114' and forward the parsed header to the lookup circuit 156 in the inbound processing path 138a. The lookup circuit 156 can then match the packet 114 to a flow based on the parsed header and identify an action for the packet 114' as contained in the flow table. In the illustrated example, the identified action can indicate that the packet 114' is to be forwarded to the NIC buffer 161 instead of to the NIC 136. The action circuit 158 can then perform the identified action by, for example, forwarding the transposed packet 114' to the NIC buffer 161 instead of to the NIC 136 after transposing the header of the packet 114' and/or performing other suitable packet manipulations. The outbound multiplexer 152' can then process the transposed packet 114' in the NIC buffer 161 by forwarding the transposed packet 114' to the outbound parser 154'. The transposed packet 114' can then be processed according to at least partially parsed header of the packet 114' and forwarded to the TOR 112 according to another rule 116 in the flow table. As such, the inbound packet 114' can be returned to the computer network via the TOR 112 without being transmitted to the virtual machines 144 or the processor 132 (FIG. 2) to be processed in software.

The foregoing implementation can be used to reduce network latency when the packets are forwarded to the processor 132 for software processing even though the processor 132 has no need to or otherwise does not apply any modifications to the packets. For example, an ER gateway server having the packet processor 138 implemented with packet routing inside the packet processor 138 can simply return packets 114' of traffic from an on-premise network to the computer network without forwarding the packets 114' to the processor 132 for software processing. Test performed with components generally similar to those described above showed a network latency reduction of about 600 microseconds when processing such network traffic from on-premise networks. The observed network latency reduction enabled an increase of data rate from about 1.5 gigabits/second to about 25 gigabits/second.

In another example, as shown in FIG. 3C, upon receiving an outbound packet 114" from, for instance, a first virtual machine 144' via the NIC 136, the outbound packet buffer 150' can temporarily store the outbound packet 114". The outbound multiplexer 152' can then retrieve the outbound packet 114" and forward the outbound packet 114" to the outbound parser 154' for processing. The outbound parser 154' can then parse at least a portion of the header of the packet 114" and forward the parsed header to the lookup circuit 156' in the outbound processing path 138b. The lookup circuit 156' can then match the packet 114" to a flow based on the parsed header and identify an action for the packet 114" as contained in the flow table. In the illustrated example, the identified action can indicate that the packet 114" is to be forwarded to the TOR buffer 151 instead of the TOR 112. The action circuit 158' can then perform the identified action by, for example, forwarding the packet 114" to the TOR buffer 151 instead of to the TOR 112 directly after optionally performing packet transposition and/or other suitable packet modifications. The inbound multiplexer 152 can then retrieve the packet 114" from the TOR buffer 151 and forward the packet 114" to the inbound parser 154. The packet 114" can then be processed according to at least partially parsed header of the packet and forwarded to the NIC 136 according to certain policy included in the flow table. The NIC 136 can then forward the packet 114" to, for instance, a second virtual machine 144" on the same host 106 (FIG. 2). As such, the outbound packet 114" can be returned to the NIC 136 and virtual machines 144 hosted on the host 106 without being transmitted to the the TOR 112.

The foregoing implementation can be useful for enabling communications between multiple networking enabled virtual machines 144 on the same host 106. For example, the lookup circuit 156' in the outbound processing path 138b can determine that the packet 114" as belonging to a flow from the first virtual machine 144' to the second virtual machine 144" on the same host 106. The lookup circuit 156' can then identify necessary header modifications such as those to virtual network addresses, virtual port numbers, etc. for the packet 114". The action circuit 158' in the outbound processing path 138b can then transpose the header of the packet 114" before forwarding the packet 114" to the TOR buffer 151. The transposed packet 114" can then be processed by the inbound processing path 138a as described above in order to be forwarded to the second virtual machine 144". As such, the TOR 112 never receives or "sees" the packet 114" from the first virtual machine 144', and thus cannot drop the packet 114" as being invalid.

Figure 4:
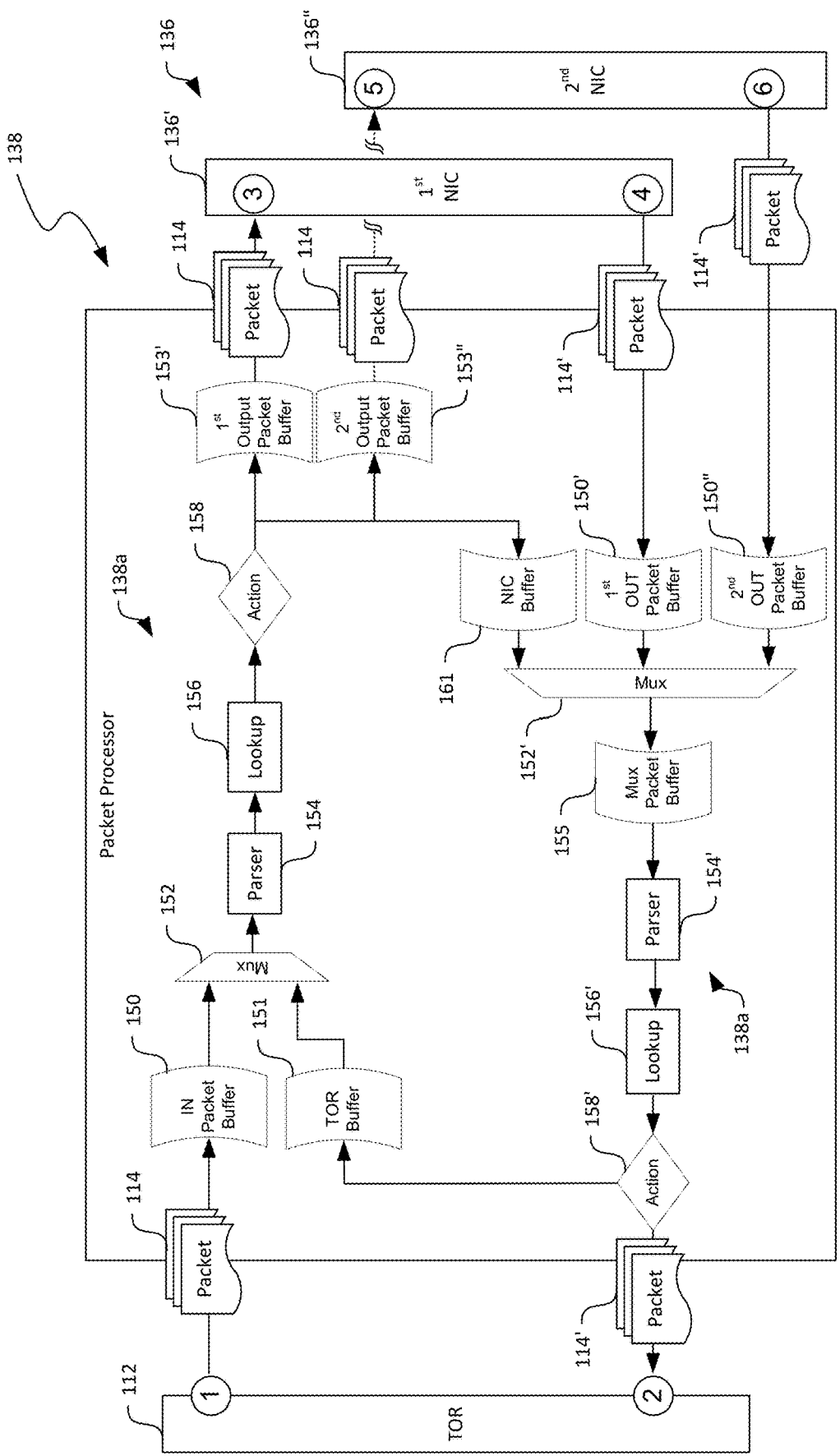
FIG. 4 is a schematic diagram illustrating a hardware packet processor implemented at a host in a distributed computing system for supporting multiple network interface cards at the host in accordance with embodiments of the disclosed technology.

Several implementations of the packet processor 138 can also allow support for multiple NICs 136 on the same host 106, as shown in FIG. 4. In FIG. 4, the memory 153 containing the flow table with the rules 116 is not shown for clarity. In certain embodiments, the packet processor 138 can assign a unique identifier (e.g., a numerical value) for each network interface with the TOR 112 or the NICs 136. For instance, as shown in FIG. 4, input/output interfaces with the TOR 112 can be labeled as interface 1 and interface 2 (shown as numbers in circles), respectively. Network interfaces to/from a first NIC 136' and a second NIC 136" both on a single host 106 can be assigned values such as 3, 4, 5, and 6, respectively. Though the network interface identification is shown in FIG. 4, similar identifications can also be applied to the packet processor 138 shown in FIGS. 3A-3C.

In addition to the components shown in FIGS. 3A-3C, the packet processor 138 can also include additional packet buffers corresponding to the first and second NICs 136 in order to facilitate communications with the first and second NICs 136. For example, as shown in FIG. 4, the packet processor 138 can include a first output packet buffer 153' and a first outbound packet buffer 150' corresponding to the first NIC 136 and a second output packet buffer 153" and a second outbound packet buffer 150" corresponding to the second NIC 136'. The first output packet buffer 153' and the second output packet buffer 153" can each be configured to receive an input from the action circuit 158 in the inbound processing path 138a and provide an output to the first NIC 136' and the second NIC 136", respectively. The first outbound packet buffer 150' and the second outbound packet buffer 150" can each be configured to receive an input from the first NIC 136' and the second NIC 136", respectively, and provide an output to the outbound multiplexer 152'.

Thus, during operation, the packet processor 138 can identify inbound packets 114 belonging to different network interfaces and forward the inbound packets 114 to the first or second NICs 136' and 136" accordingly via corresponding first or second output packet buffer 153' or 153" and corresponding network interfaces. Similarly, outbound packets 114' received from the first and second NICs 136' and 136" can be temporally stored in the first or second outbound packet buffer 150' or 150". The outbound multiplexer 152' can then retrieve the outbound packets 114' from the first or second outbound packet buffer 150' or 150", or the NIC buffer 161 and forward the packets 114' to the outbound parser 154' via an optional multiplexer packet buffer 155 to be processed as described above with reference to FIGS. 3B and 3C.

Though only two NICs 136 and 136' are shown in FIG. 4 for illustration purposes, in other embodiments, the packet processor 138 can support three, four, or any suitable number of NICs (not shown) by including additional output packet buffers and outbound packet buffers (not shown). In other embodiments, at least one of the multiplier packet buffer 155, the TOR buffer 151, or the NIC buffer 161 may be omitted from the packet processor 138.

FIG. 5 is a schematic diagram illustrating example conditions and corresponding actions for a rule 116 (FIGS. 3A-3C) as an entry in a flow table in accordance with embodiments of the disclosed technology. In certain embodiments, as shown in FIG. 5, the rule 116 can include actions upon matching packets in a MAT model. When creating an entry, a network controller (not shown) can be expressive while reducing fixed policy in a data plane.

As shown in FIG. 5, the rule 116 can include a condition list containing multiple conditions 172, and one or more corresponding actions 176. Example conditions 172 can include source/destination MAC, source/destination IP, source/destination TCP port, source/destination User Datagram Protocol ("UDP") port, general routing encapsulation key, Virtual Extensible LAN identifier, virtual LAN ID, or other metadata regarding the payload of the packet. Conditions 172 can have a type (such as source IP address) and a list of matching values (each value may be a singleton, range, or prefix). For a condition to match a packet, any of the matching values can match as in an OR clause. For an rule 116 to match, all conditions 172 in the rule 116 match as in an AND clause.

The action 176 can also contain a type and a data structure specific to that type with data needed to perform the action. For example, an encapsulation rule 116 can takes as input data a source/destination IP address, source/destination MAC address, encapsulation format and key to use in encapsulating the packet. As shown in FIG. 5, the example actions can include allow/circuit a packet according to, for example, ACLs, network name translation (L3/L4), encapsulation/decapsulation, quality of service operations (e.g., rate limit, mark differentiated services code point, metering, etc.), encryption/decryption, stateful tunneling, and routing (e.g., equal cost multiple path routing).

The rule 116 can be implemented via a callback interface, e.g., initialize, process packet, and de-initialize. If a rule type supports stateful instantiation, the virtual switch 141 (FIG. 2) or other suitable types of process handler can create a pair of flows in the packet processor 138 (FIG. 3A). Flows can also be typed and have a similar callback interface to rules 116. A stateful rule 116 can include a time to live for a flow, which is a time period that a created flows can remain in a flow table after a last packet matches unless expired explicitly by a TCP state machine. In addition to the example set of actions 176 in FIG. 5, user-defined actions can also be added, allowing the network controllers to create own rule types using a language for header field manipulations.

Figure 6A:
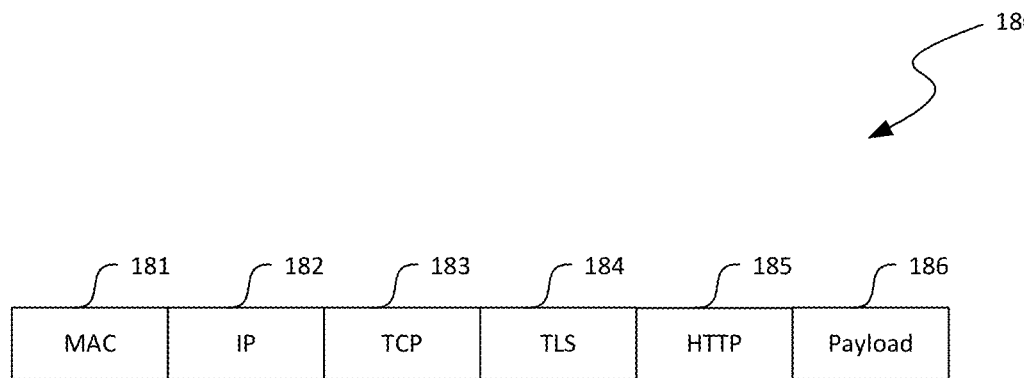
FIGS. 6A and 6B illustrate an example data schema for a packet header suitable to be processed by a hardware packet processor in accordance with embodiments of the disclosed technology.

FIG. 6A is a schematic diagram illustrating a data schema 180 suitable for a packet header in accordance with embodiments of the disclosed technology. As shown in FIG. 6A, the data schema 180 can include a MAC field 181, an IP field 182, a TCP field 183, a TLS field 184, an HTTP field 185, and a data field 186. The MAC field 181, the IP field 182, and the TCP field 183 can be configured to contain a MAC address, an IP address, and a port number of the NIC 136 (FIG. 2) and/or the host 106 (FIG. 2), respectively. The TLS field 184 can be configured to contain a value indicating a type of data contained in the packet. Example values for the TLS field 184 can include APPLICATION_DATA, CHANGE_CIPHER_SPEC, ALERT, or HANDSHAKE. The HTTP field 185 can be configured to contain various parameters according to the HTTP protocol. For example, the parameters can include a content length of the data in the data field 186, cache control, etc. Example header fields of the HTTP field 185 are described in more detail with reference to FIG. 6B. Even though the example data schema 180 includes the HTTP field 185, in other embodiments, the data schema 180 can include Secure Shell, Secure Copy, Secure FTP, or other suitable header fields.

Figure 6B:
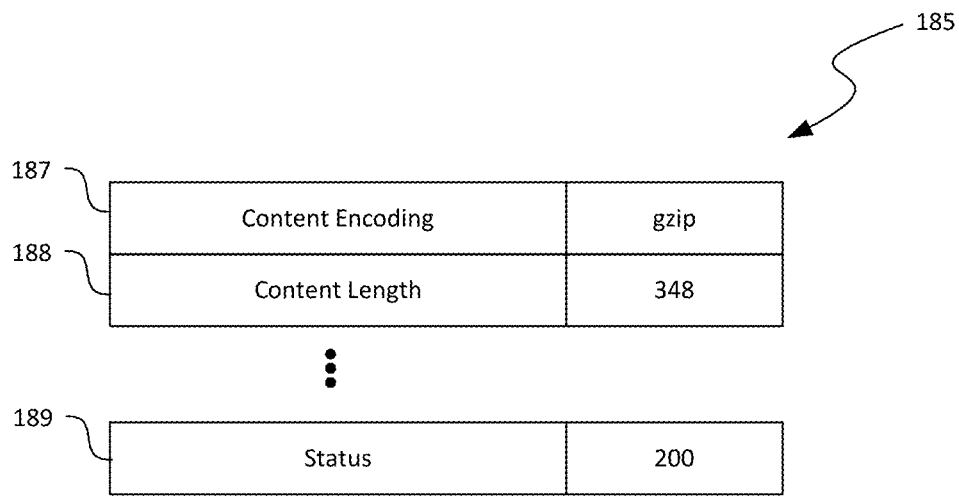

FIG. 6B is a schematic diagram illustrating example header fields suitable for the HTTP field 185 in FIG. 6A in accordance with embodiments of the disclosed technology. As shown in FIG. 6B, the header fields can include a content encoding field 187 configured to contain an encoding identification, a content length field 188 configured to store a content or payload length in, for instance, bytes, and a status field 189 configured to contain a numerical value indicating whether the content or payload associated with the HTTP header is valid. In the illustrated example, the content encoding field 187 contains "gzip" as an encoding identifier; the content length field 188 contains "348" indicating that the content or payload is 348 bytes long; and the status field 189 contains a numerical value of "200" indicating that the content or payload is valid. Though particular fields are shown in FIG. 6B as examples, in other embodiments, the HTTP header 185 can also include fields configured to contain content language, content location, content range, and/or other suitable parameters.

Figure 7A:
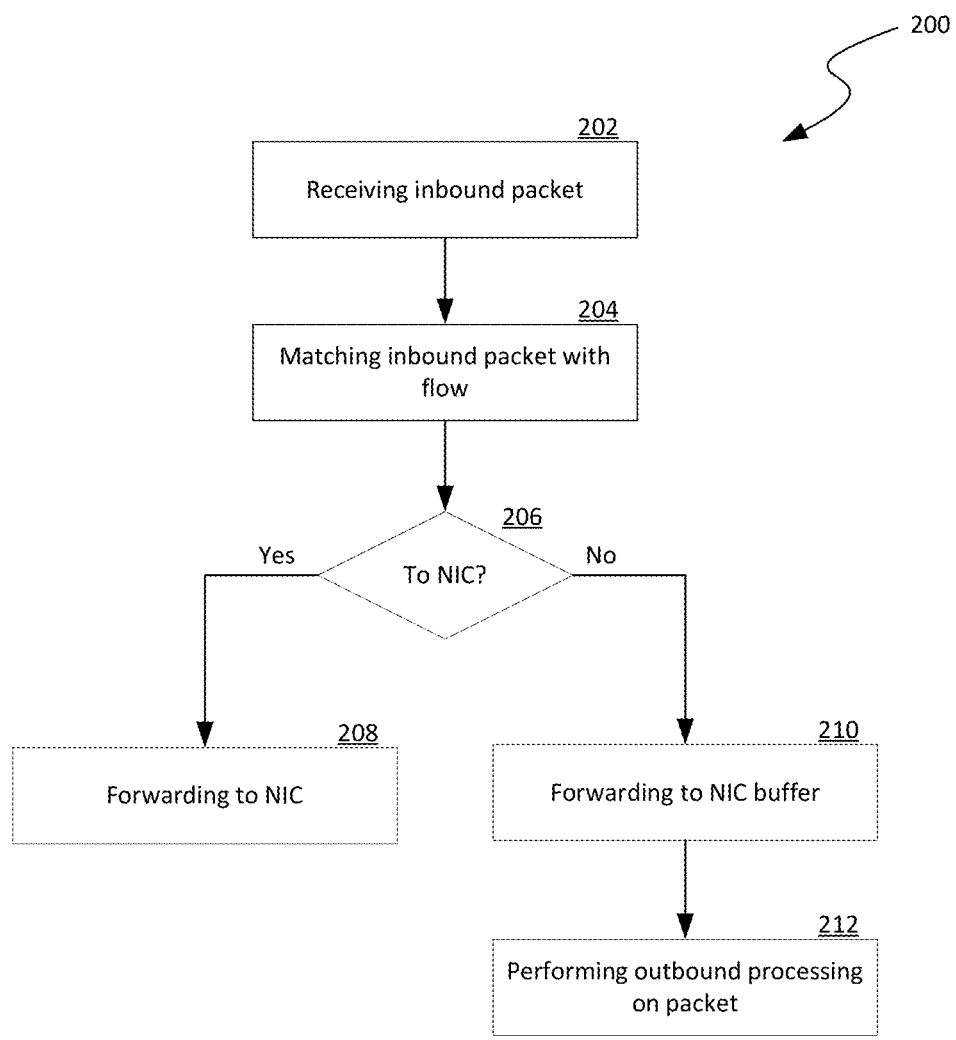
FIGS. 7A and 7B are flowcharts illustrating processes for network traffic routing in accordance with embodiments of the disclosed technology.
Figure 7B:
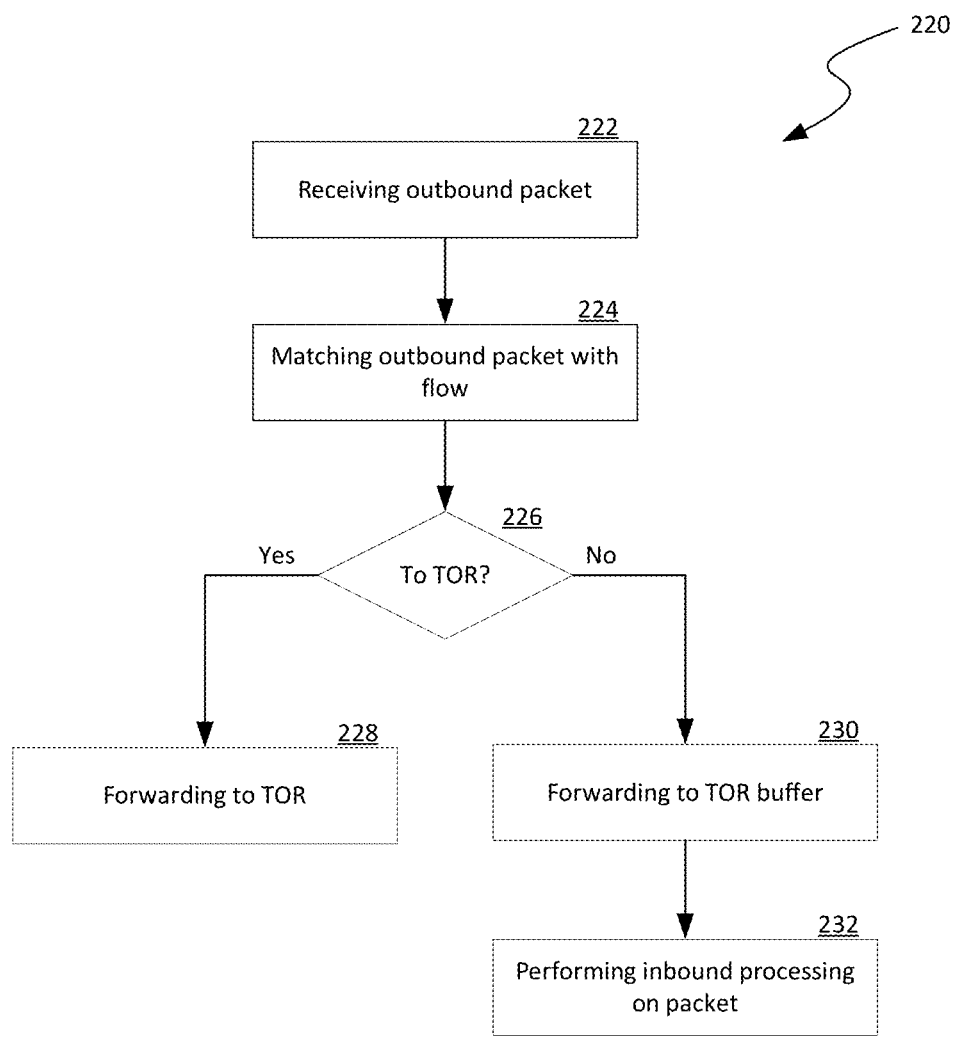

FIGS. 7A and 7B are flowcharts illustrating processes 200 and 220 for inbound and outbound network traffic routing, respectively, in accordance with embodiments of the disclosed technology. Though the processes 200 and 220 are described below in light of the distributed computing system 100 of FIGS. 1-4, in other embodiments, the processes can also be performed in other computing systems with similar or different components.

As shown in FIG. 7A, the process 200 can include receiving an inbound packet at stage 202. In certain embodiments, the inbound packet may be received at a packet processor 138 (FIG. 2) from a TOR 112 (FIG. 2) interconnected to a host 106 (FIG. 2) incorporating the packet processor 138. In other embodiments, the inbound packet may be received from other suitable network nodes. The process 200 can then include matching the received inbound packet with a flow in a flow table at stage 204. In certain embodiments, matching the inbound packet can include parsing a header of the inbound packet, matching at least a portion of the header to an entry in a flow table, and identifying an action corresponding to the entry. In other embodiments, matching the inbound packet can also include forwarding the inbound packet to a software component for further processing when an entry in the flow table cannot be located as matching the inbound packet.

The process 200 can then include a decision stage 206 to determine whether the inbound packet is to be forwarded to a NIC 136 (FIG. 2) of the host 106 based on the identified action in the flow table. In one example, the inbound packet is to be forwarded to the NIC 136 when the inbound packet is destined to an application 147 (FIG. 2), a virtual machine 144 (FIG. 2), or other suitable components in the host 106. In other examples, the inbound packet is to be forwarded to the NIC 136 for other suitable reasons. As shown in FIG. 7A, in response to determining that the inbound packet is to be forwarded to the NIC 136, the process 200 can include forwarding the inbound packet to the NIC 136, by, for example, copying the inbound packet into a buffer of the NIC 136 at stage 208. Otherwise, the process 200 can include forwarding the inbound packet to a NIC buffer 161 (FIG. 3A) in the packet processor 138.

The process 200 can then include performing outbound processing on the inbound packet in the NIC buffer at stage 212. In certain embodiments, the outbound processing can include parsing the header of the packet and matching at least a portion of the parsed header to one or more entries in the flow table identifying one or more actions. The process 200 can then include performing the identified actions to, for instance, forwarding the packet to the TOR 112 without transmitting the inbound packet to the NIC 136. As such, the virtual switch 141 (FIG. 2) or other suitable software components provided by the processor 132 (FIG. 2) of the host 106 never receives the inbound packet, nor performing any software processing on the inbound packet.

FIG. 7B illustrates a process 220 for outbound network traffic routing in accordance with embodiments of the disclosed technology. As shown in FIG. 7B, the process 220 can include receiving an outbound packet at stage 222. In certain embodiments, the outbound packet 222 can be received via a NIC 136 (FIG. 2) from an application 147 (FIG. 2), a virtual machine 144 (FIG. 2), or other software components on a host 106 (FIG. 2). The process 220 can then include matching the outbound packet with a flow in a flow table at stage 224. The matching operations can be generally similar those described above with reference to the process 200 in FIG. 7A. The process 220 can then include a decision stage 226 to determine whether the outbound packet is to be forwarded to the overlay/underlay network 108'/108 (FIGS. 1 and 2) via a TOR 112 (FIG. 2). In certain embodiments, the outbound packet is forwarded to the TOR 112 when the outbound packet is destined to an application 147, a virtual machine 144, or other suitable software components on a different host 106. In other embodiments, the outbound packet is not forwarded to the TOR 112 when the outbound packet is transmitted from a first virtual machine 144' to a second virtual machine 144" or between other suitable software components hosted on the same host 106.

In response to determining that the outbound packet is to be forwarded to the TOR 112, the process 220 can include forwarding the outbound packet to the TOR at stage 228. The TOR 112 can then process the outbound packet and forward the outbound packet to a suitable destination in the distributed computing system 100 (FIG. 1) via the overlay/underlay network 108'/108. In response to determining that the outbound packet is not to be forwarded to the TOR 112, the process 220 can include forwarding the outbound packet to a TOR buffer 151 (FIG. 3A) at stage 230. The process 220 can then include processing the outbound packet in the TOR buffer 151 via inbound processing generally similar to that described above with reference to FIG. 7A and forwarded to an application 147, a virtual machine 144, or other suitable software components on the same host 106. As such, communications between network enabled software components on the same host 106 can be enabled.

Figure 8:
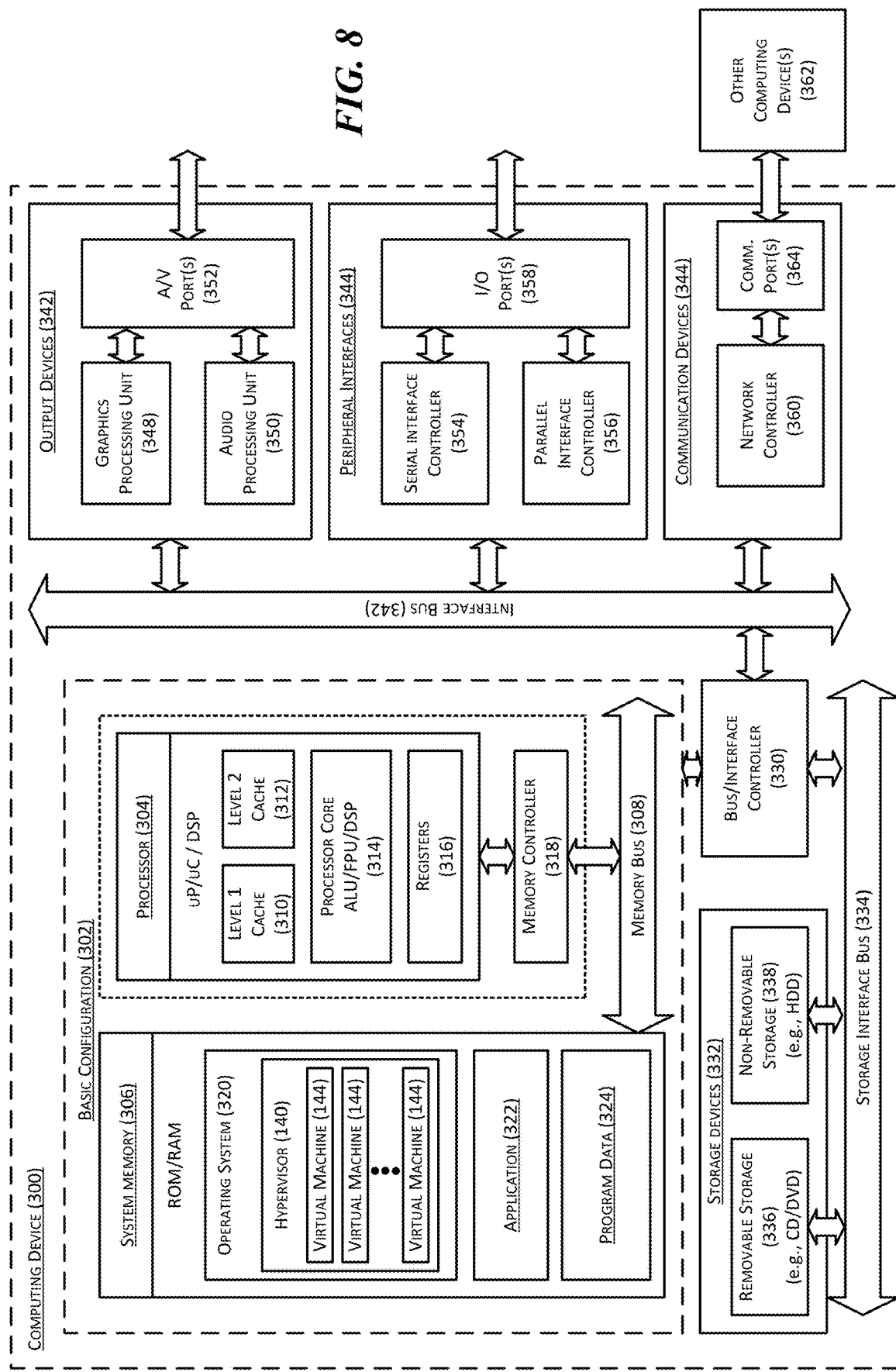
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for routing network traffic in a distributed computing system having a plurality of hosts interconnected by a computer network, the individual hosts having a main processor, a network interface card ("NIC"), and a hardware packet processor operatively coupled to one another, the method comprising:
   receiving, from the computing network, a packet at the packet processor of a host, the packet processor including an inbound processing path and an outbound processing path in opposite processing directions;
   matching the received packet with a flow in a flow table contained in the packet processor following the inbound processing path of the packet processor, the flow being associated with an action in the flow table;
   determining whether the action indicates that the received packet is to be forwarded to a NIC buffer in the outbound processing path of the packet processor instead of the NIC; and
   in response to determining that the action indicates that the received packet is to be forwarded to the NIC buffer,
      forwarding the received packet to the NIC buffer; and
      processing the packet in the NIC buffer following the outbound processing path to forward the packet to the computer network without exposing the packet to the main processor, thereby reducing network latency associated with the packet by avoiding software processing of the packet utilizing the main processor of the host.

2. The method of claim 1 wherein:
   the inbound processing path includes a parser, a lookup circuit, and an action circuit operatively coupled to one another in sequence; and
   matching the received packet includes:
      parsing a header of the received packet with the parser;
      matching at least a portion of the parsed header with an entry in the flow table; and
      identifying the action as indicated by the entry in the flow table.

3. The method of claim 1 wherein:
   the inbound processing path includes an action circuit configured to perform the action, the action circuit having a first output to the NIC buffer and a second output to the NIC; and
   forwarding the received packet to the NIC buffer includes selectively forwarding the received packet to the NIC buffer via the first output of the action circuit in the inbound processing path.

4. The method of claim 1 wherein:
   the inbound processing path includes an action circuit configured to perform the action, the action circuit having a first output to the NIC buffer and a second output to the NIC; and
   the method further includes in response to determining that the action indicates that the received packet is to be forwarded to the NIC instead of the NIC buffer, forwarding the received packet to the NIC via the second output of the action circuit.

5. The method of claim 1 wherein:
   the outbound processing path includes an outbound multiplexer operatively coupled to the NIC buffer, the outbound multiplexer being configured to process input from the NIC buffer in a round-a-robin fashion; and
   processing the packet in the NIC buffer includes retrieving the packet from the NIC buffer using the outbound multiplexer and processing the retrieved packet following the outbound processing path.

6. The method of claim 1 wherein:
   the outbound processing path includes an outbound multiplexer operatively coupled to the NIC buffer and an outbound packet buffer configured to receive an outbound packet from the NIC, the outbound multiplexer being configured to process input from the NIC buffer and the outbound packet buffer in a round-a-robin fashion; and
   processing the packet in the NIC buffer includes selectively retrieving the packet from the NIC buffer using the outbound multiplexer and processing the retrieved packet following the outbound processing path.

7. The method of claim 1 wherein:
   receiving the packet includes receiving the packet at the packet processor via a switch in the computer network; and
   processing the packet in the NIC buffer include processing the packet in the NIC buffer following the outbound processing path to forward the packet to the computer network via the same switch.

8. A method for routing network traffic in a distributed computing system having a plurality of hosts interconnected by a computer network, the individual hosts having a main processor, a network interface card ("NIC"), and a hardware packet processor operatively coupled to one another, the method comprising:
   receiving, at the packet processor, a packet generated by a first virtual machine on the host and destined to a second virtual machine on the same host in the distributed computing system, the packet processor including an inbound processing path and an outbound processing path in opposite processing directions;
   matching the received packet with a flow in a flow table contained in the packet processor following the outbound processing path of the packet processor, the flow being associated with an action in the flow table;

determining whether the action indicates that the received packet is to be forwarded to a buffer in the inbound processing path of the packet processor instead of a switch in the computer network; and in response to determining that the action indicates that the received packet is to be forwarded to the buffer, forwarding the received packet to the buffer; and processing the packet in the buffer following the inbound processing path to forward the packet to the second virtual machine without exposing the packet to the switch in the computer network, thereby enabling network communications between the first and second virtual machines on the same host by avoiding exposing the packet to the switch.

9. The method of claim 8 wherein:

the outbound processing path includes a parser, a lookup circuit, and an action circuit operatively coupled to one another in sequence; and matching the received packet includes:
parsing a header of the received packet with the parser;
matching at least a portion of the parsed header with an entry in the flow table; and
identifying the action as indicated by the entry in the flow table.

10. The method of claim 8 wherein:

the outbound processing path includes an action circuit configured to perform the action, the action circuit having a first output to the buffer and a second output to the switch; and forwarding the received packet to the buffer includes selectively forwarding the received packet to the buffer via the first output of the action circuit in the outbound processing path.

11. The method of claim 8 wherein:

the outbound processing path includes an action circuit configured to perform the action, the action circuit having a first output to the buffer and a second output to the switch; and the method further includes in response to determining that the action indicates that the received packet is to be forwarded to the switch instead of the buffer, forwarding the received packet to the switch via the second output of the action circuit.

12. The method of claim 8 wherein:

the inbound processing path includes an inbound multiplexer operatively coupled to the buffer, the inbound multiplexer being configured to process input from the buffer in a round-a-robin fashion; and processing the packet in the buffer includes retrieving the packet from the buffer using the inbound multiplexer and processing the retrieved packet following the inbound processing path.

13. The method of claim 8 wherein:

the inbound processing path includes an inbound multiplexer operatively coupled to the buffer and an inbound packet buffer configured to receive an inbound packet from the switch, the inbound multiplexer being configured to process input from the buffer and the inbound packet buffer in a round-a-robin fashion; and processing the packet in the buffer includes selectively retrieving the packet from the buffer using the inbound multiplexer and processing the retrieved packet following the inbound processing path.

14. The method of claim 8 wherein:

receiving the packet includes receiving the packet at the packet processor via the NIC; and processing the packet in the buffer include processing the packet in the buffer following the inbound processing path to forward the packet to the second virtual machine via the same NIC.

15. A method for routing network traffic in a distributed computing system having a plurality of hosts interconnected by a computer network, the individual hosts having a main processor, first and second network interface cards ("NICs"), and a hardware packet processor operatively coupled to one another, the method comprising:

receiving, at the packet processor, a first packet via the first NIC and a second packet via the second NIC;

storing the first and second packets in first and second outbound packet buffers of the packet processor, respectively, the first and second outbound packet buffers being operatively coupled to an outbound multiplexer configured to alternately receive input from both the first and second outbound packet buffers;

using the outbound multiplexer to alternately process the first and second packets from the first and second outbound packet buffers, respectively; and forwarding both the first and second packets received from the first and second NICs to a switch in the computer network for transmission to corresponding target destinations associated with the first and second packets.

16. The method of claim 15, further comprising:

receiving, from the switch, an inbound packet at the packet processor;

in response to receiving the inbound packet,
determining whether the inbound packet is destined to the first or second NIC;
in response to determining that the inbound packet is destined to the first NIC, forwarding the inbound packet to a first output packet buffer operatively coupled to the first NIC; and
in response to determining that the inbound packet is destined to the second NIC, forwarding the inbound packet to a second output packet buffer operatively coupled to the first NIC.

17. The method of claim 16 wherein:

a first network interface between the packet processor and the first NIC is identified by a first identifier;

a second network interface between the packet processor and the second NIC is identified by a second identifier; and determining whether the inbound packet is destined to the first or second NIC includes determining whether the inbound packet is destined to the first or second NIC based on a network interface value associated with the inbound packet.

18. The method of claim 16 wherein:

a first network interface between the packet processor and the first NIC is identified by a first identifier;

a second network interface between the packet processor and the second NIC is identified by a second identifier; and determining whether the inbound packet is destined to the first or second NIC includes determining whether a network interface value associated with the inbound packet matches the first identifier; and in response to determining that the network interface value associated with the inbound packet matches the first identifier, forwarding the inbound packet to a first output packet buffer operatively coupled to the first NIC.

19. The method of claim 16 wherein:
a first network interface between the packet processor and the first NIC is identified by a first identifier;
a second network interface between the packet processor and the second NIC is identified by a second identifier; and
determining whether the inbound packet is destined to the first or second NIC includes determining whether a network interface value associated with the inbound packet matches the second identifier; and
in response to determining that the network interface value associated with the inbound packet matches the second identifier, forwarding the inbound packet to a second output packet buffer operatively coupled to the second NIC.

20. The method of claim 15 wherein:
the outbound processing path further includes a multiplexer packet buffer connected to an output of the outbound multiplexer; and
the method further includes:
- alternately forwarding, from the outbound multiplexer, the first and second packets from the first and second outbound packet buffers to the multiplexer packet buffer; and
- temporarily storing both the forwarded first and second packets in the multiplexer packet buffer.

* * * * *